Patented Dec. 27, 1932

1,892,457

UNITED STATES PATENT OFFICE

DONATO COZZOLINO, OF SAN JACINTO, CALIFORNIA, ASSIGNOR TO GIULIA COZZOLINO, OF SAN JACINTO, CALIFORNIA

PROCESS OF STABILIZING CEREAL BEVERAGES

No Drawing.   Application filed April 15, 1930.   Serial No. 444,612.

My invention relates to the stabilization of cereal beverages and to processes of the character embodied in my Patent No. 1,766,428, issued June 24, 1930, in which the beverage is treated with a solution of tannin and a siliceous clay to precipitate the undesirable albuminoids which render the finished beverage turbid when chilled, the precipitate being removed from the beverage by filtration so that the beverage is rendered immune to turbidity at any temperature and particularly when chilled, as well as any change in color or taste, even when subjected to the subsequent brewing operations.

In processes of this character, I have discovered that they are not completely effective for the purposes intended in all instances because of the variation in character of the malt and hops used. In cases where the process is not completely effective, all objectionable albuminoids do not combine with the siliceous clay and as a consequence some remain soluble and in suspension so that they cannot be removed by filtration.

It is a purpose of my present invention to provide a process which is operable, in its adaptation to all cereal beverages and particularly to "near beer", to convert all objectionable albuminoids into products which can be separated by filtration irrespective of the nature of the malt and hops used, and, as a consequence, causing all albuminoids to be precipitated and the subsequent removal thereof by filtration, thus leaving the beverage free of all turbidity at any temperature and without affecting the flavor and color of the beverage.

These results are obtained in all cases through the use of a solution of tannic acid in which is diluted a siliceous clay, such as kaolin, Spanish earth, or infusorial earth, as in my former process, but to which is added a proteolytic enzyme such as pepsin, or papaya extract, these agents together forming a compound causing all albuminoids which would not be rendered insoluble by the use of the solution of tannic acid and siliceous clay or proteolytic enzyme separately, to be rendered insoluble so that all undesirable albuminoids present, can be easily separated from the beverage by filtration, to the end of producing a stable beverage free from cloudiness for an extended period of time.

In the practice of my process, I proceed as follows:

After fermentation or dealcoholization of a quantity of 50 barrels of cereal beverage, I introduce into the mass a stabilizing solution of one pound of tannic acid, one pound of pure silica clay, and five grams of proteolytic enzyme. This compound is mixed by stirring until the solution is evenly distributed throughout the liquid, when the beverage is allowed to stand for a period of about five days, which is sufficient to permit the enzyme to combine with the tannic acid and siliceous clay rendering all albuminoids insoluble and cause their adherence to the clay particles so that the resultant precipitate can be removed by filtering. Thus all undesirable albuminoids are completely removed, and the beverage thus rendered immune to turbidity at any temperature and particularly when chilled, as well as any change in color and taste, even when subjected to the subsequent brewing operations.

I am aware that proteolytic enzymes have heretofore been used for the stabilization of cereal beverages, but they are not completely effective except when used with tannic acid and siliceous clay or their equivalents.

Although I have herein shown and described only one form of process of stabilizing cereal beverages embodying my invention, it is to be understood that various changes and modifications may be made therein without departing from the spirit of the invention and the spirit and scope of the appended claims.

I claim as my invention:

1. A process of stabilizing cereal beverages which comprises treating the beverage with a solution consisting of tannin, siliceous clay and a proteolytic enzyme in the following approximate proportions in the treatment of fifty barrels of the beverage: one pound of tannin, one pound of siliceous clay, and five grams of proteolytic enzyme.

2. A process of stabilizing cereal beverages which comprises treating the beverage at any stage of the brewing process with a solution of tannin, siliceous clay and a pepsin together forming a compound changing all undesirable albuminoids into products which precipitate and are thereby rendered removable by filtration, and finally removing the precipitate.

3. In a process of stabilizing cereal beverages, the step of treating the beverage with a solution of tannic acid, siliceous clay, and a proteolytic enzyme, together forming a compound which has an affinity and absorbing power for all undesirable albuminoids in the beverage.

DONATO COZZOLINO.